US004001659B2

United States Statutory Invention Registration [19]

[11] Reg. Number: H1659

Semiatin et al.

[45] Published: Jul. 1, 1997

[54] METHOD FOR HEAT TREATING TITANIUM ALUMINIDE ALLOYS

[75] Inventors: Sheldon L. Semiatin, Dayton, Ohio; David S. Lee, Chesterfield, Mo.; Dennis M. Dimiduk, Beavercreek, Ohio

[73] Assignee: The United States of America as represented by the Secretary of the Air Force, Washington, D.C.

[21] Appl. No.: 437,858

[22] Filed: May 8, 1995

[51] Int. Cl.[6] ..... C22F 1/18

[52] U.S. Cl. ..... 148/669; 148/670; 148/671

[58] Field of Search ..... 148/669, 670, 148/671

[56] References Cited

U.S. PATENT DOCUMENTS

| | | | |
|---|---|---|---|
| 4,893,743 | 1/1990 | Eylon et al. | 228/181 |
| 4,896,815 | 1/1990 | Rosenthal et al. | 228/120 |
| 5,118,026 | 6/1992 | Stacher | 228/157 |
| 5,328,530 | 7/1994 | Semiatin et al. | 148/559 |
| 5,350,466 | 9/1994 | Larsen et al. | 148/421 |

OTHER PUBLICATIONS

C. McCullough et al, "Phase Equilibria and Solidification in Ti–Al–Alloys" Acta Metall 37(5), 1321–1336 (1989).

S. Semiatin et al, "Homogenization of Near–Gamma Titanium Aluminides: Analysis of Kinetics and Process Scaleup Feasibility," Metall Trans 24A, 1295–1306 Jun. (1993).

*Primary Examiner*—Charles T. Jordan

*Assistant Examiner*—Meena Chelliah

*Attorney, Agent, or Firm*—Bobby D. Scearce; Thomas L. Kundert

[57] ABSTRACT

A heat treatment method for producing moderate α grain size (50-250 μm) fully lamellar, microstructures in thin cross section near-γ titanium aluminide alloy products is described, wherein a wrought, fine y grain starting microstructure is heated at a temperature high in the two-phase α+γ phase field and 30-60° C. below the α transus temperature to produce a structure of small equiaxed α grains (about 25 μm dim) and fine γ phase grains, which is then briefly heated to a temperature in the single-phase α field in order to complete dissolution of remnant γ grains and to minimize growth of α grains. The material is then cooled to transform the microstructure to fully lamellar $\alpha_2$+γ.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR HEAT TREATING TITANIUM ALUMINIDE ALLOYS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to methods for heat treating metals and alloys, and more particularly to a heat treat method for making fully lamellar, moderate alpha ($\alpha$) grain size microstructures in near-gamma ($\gamma$) titanium aluminide alloys having good room temperature strength, ductility, and fracture toughness and high temperature creep resistance.

Near-$\gamma$ titanium aluminide alloys are extremely useful for applications requiring high temperature strength and creep resistance. In many applications, however, such as in jet engines, the alloys must also exhibit an acceptable level of room temperature ductility and fracture toughness for product manufacture and assembly and for damage tolerance during service.

Although a balance of room and high temperature properties in near-$\gamma$ titanium aluminide alloys might be achieved in a fully lamellar alloy having moderate a grain size (100 to 200 μm), conventional methods for heat treatment of the alloy have not been successful because $\alpha$ grain growth in the alloy is rapid and leads to grain sizes of the order of 500 to 1000 μm.

Alternative processing methods which have been developed to overcome the difficulty associated with rapid $\alpha$ grain growth include the addition of tungsten, titanium diboride particulate, or other alloying material to restrain a grain growth during heat treatment in the single phase $\alpha$ field. In another alternate method, a desirable balance of room and high temperature properties in near-$\gamma$ titanium aluminide alloys is achieved wherein canned material is preheated below the $\alpha$ transus temperature (temperature at which $\alpha+\gamma \rightarrow \alpha$ in the alloy) and then extruded. During extrusion, deformation work produces a transient which raises the workpiece temperature into the single phase $\alpha$ field thus producing a recrystallized, moderate $\alpha$ grain size. This type of process may be limited to large cross section, bulk formed semifinished parts because of the difficulty of controlling the unavoidable die chilling that occurs during such conventional metal working processes.

The present invention is applicable to substantially any near-$\gamma$ alloy irrespective of chemical composition, and is well suited to the production of a wide variety of semifinished or finished shapes of thin ($\leqq$20 mm) cross-section such as flat or formed sheet produced by superplastic forming, thin cross section bar or wire products, or other thin cross section product shapes. Total heat treatment time (typically 10–20 min) is much shorter than conventional heat treatments and does not rely on special alloying additions or on second-phase dispersions to control grain size.

It is therefore a principal object of the invention to provide a method for heat treating metals and alloys.

It is another object of the invention to provide a heat treat method for titanium aluminide alloys.

It is yet another object of the invention to provide a method for producing fully lamellar moderate $\alpha$ grain size microstructures in near-$\gamma$ titanium aluminide alloys having good room temperature strength, ductility, and toughness and high temperature creep resistance.

These and other objects of the invention will become apparent as a detailed description of representative embodiments proceeds.

SUMMARY OF THE INVENTION

In accordance with the foregoing principles and objects of the invention, a heat treatment method for producing moderate ct grain size (50–250 μm) fully lamellar, microstructures in thin cross section near-$\gamma$ titanium aluminide alloy products is described, wherein a wrought, fine $\gamma$ grain starting microstructure is heated at a temperature high in the two-phase $\alpha+\gamma$ phase field and 30°–60° C. below the $\alpha$ transus temperature to produce a structure of small equiaxed $\alpha$ grains (about 25 μm diam) and fine $\gamma$ phase grains, which is then briefly heated to a temperature in the single-phase $\alpha$ field in order to complete dissolution of remnant $\gamma$ grains and to minimize growth of $\alpha$ grains. The material is then cooled to transform the microstructure to fully lamellar $\alpha_2+\gamma$.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
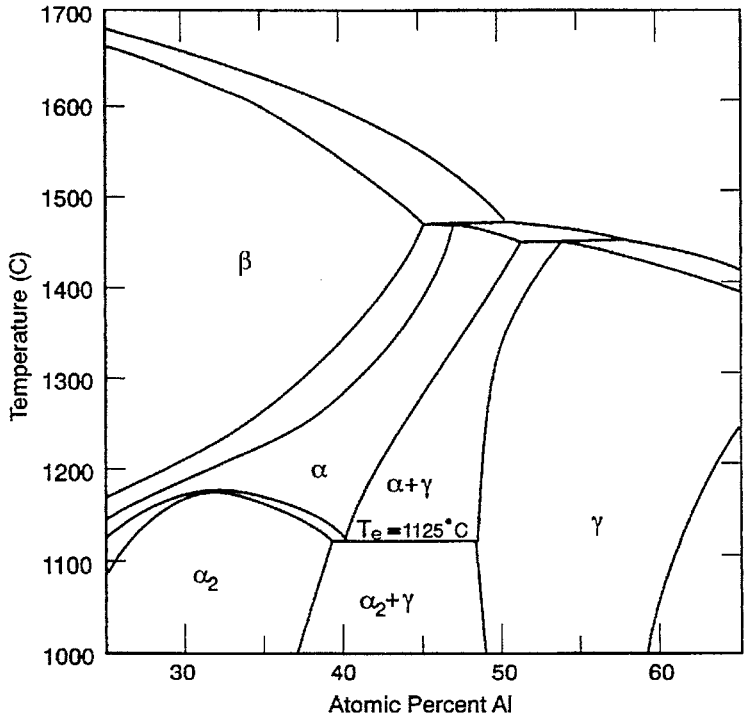
FIG. 1 is an equilibrium Ti-Al phase diagram showing the alloys of interest herein.

Referring now to the drawings, FIG. 1 shows an equilibrium phase diagram for the binary titanium-aluminum system (from C. McCullough et at, "Phase Equilibria and Solidification in Ti-Al Alloys," Acta Metall. 37 (5), 1321–1336 (1989), the teachings of which are incorporated herein by reference) showing the $\alpha+\gamma$ and single phase $\alpha$ fields of interest in the practice of the invention.

In accordance with a governing feature of the invention, moderate $\alpha$ grain size (50–250 μm) fully lamellar, microstructures in thin cross section near-$\gamma$ titanium aluminide products are produced in a heat treatment method comprising substantially two steps. Starting material for the method is wrought, neat-$\gamma$ titanium aluminum alloy which has been prior processed to yield a recrystallized microstructure of fine equiaxed $\gamma$ grains in a matrix of $\alpha_2\gamma$. The equiaxed $\gamma$ grains typically are 3 to 25 μm in diameter and comprise 50% or more of the microstructure. The prior processing to produce this microstructure is typically that associated with conventional ingot metallurgy processing, including steps such as ingot melting and casting, hot isostatic pressing to seal casting porosity, homogenization heat treatment, and primary ingot breakdown by forging, extrusion, or other forming process. Depending on the specific process or product form, other steps such as closed-die forging, rolling, sheet forming, or intermediate or final recrystallization heat treatments at temperatures low in the $\alpha+\gamma$ phase field may also be utilized to obtain or retain the desired starting microstructure.

Figure 2:
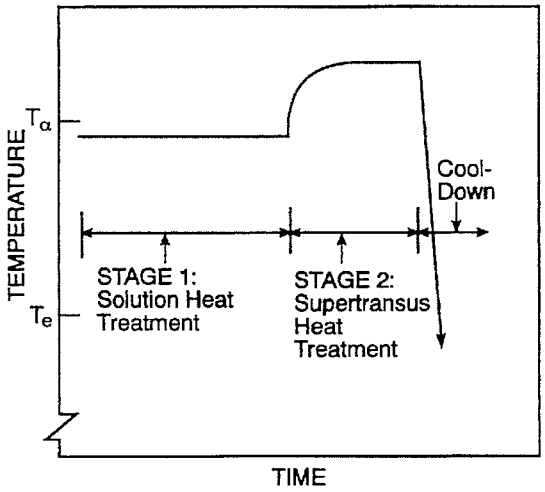
FIG. 2 is a schematic block diagram of the two-stage heat treatment method of the invention.

As shown in FIG. 2, heat treatment of the starting material is performed in successive steps at temperatures in the $\alpha+\gamma$ phase field between $T_\alpha$ (the $\alpha$ transus temperature) and $T_c$ (the eutectoid temperature) and then in the single phase $\alpha$ phase alpha field (FIG 1). In particular, the alloy is first solution heat treated in a furnace at a temperature high in the $\alpha+\gamma$ field and at about 30° to 60° C. (preferably 40° to 50° C.) below the $\alpha$ transus temperature for about 10 minutes to two hours (preferably 10–15 min) in order to achieve in the alloy a microstructure (at the heat treatment temperature) of equiaxed $\alpha$ phase grains of about 25 gm comprising at least two-thirds of the microstructure, surrounded by fine (1–5 μm) $\gamma$ phase grains (i.e., the remnants of the larger $\gamma$ phase grains in the starting material).

The next step of the method comprises a short-time temperature transient into the single phase $\alpha$ alpha field. After heat treatment according to the first step described above, the alloy is heated in a furnace at about 20° to 50° C. (preferably 20° to 30° C.) above the $\alpha$ transus temperature, during which heating the remnant $\gamma$ phase particles dissolve, thus producing a single phase equiaxed $\alpha$ structure with a grain size which increases with time of heating. In order to avoid excessive grain growth, heating is brief, typically 30 to 240 seconds, depending on the thickness of the alloy and desired $\alpha$ phase grain size. For thicknesses of 3 to 10 mm, $\alpha$ phase grain sizes of 50 to 250 μm are readily obtained in near-$\gamma$ titanium aluminides.

The alloy is then air cooled or cooled using a combination of air cooling and oil quenching to transform the single-phase $\alpha$ grains to a fully lamellar $\alpha_2+\gamma$ microstructure. Subsequent low-temperature heat treatments, typically in the $\alpha_2+\gamma$ phase field, may be used to modify the thickness of the $\alpha_2+\gamma$ lamellae or to stabilize the microstructure.

Figure 3:
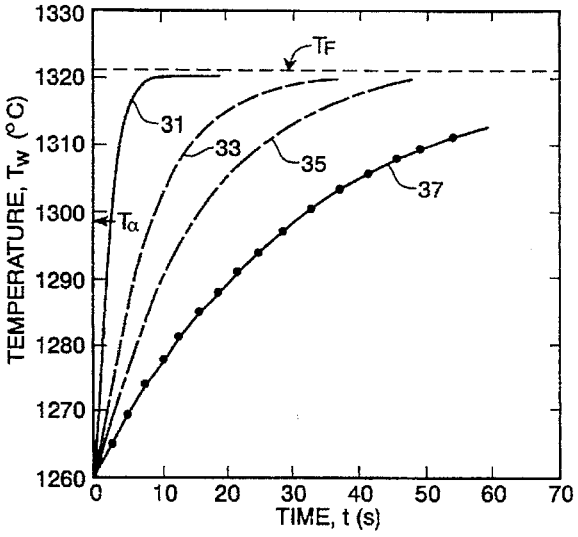
FIG. 3 shows calculated temperature transients in near-gamma titanium aluminide alloys during the second stage of the two-stage heat treatment method of the invention.

Referring now to FIG. 3, shown therein is a graph of the calculated temperature transients experienced by near-$\gamma$ titanium aluminide products of various thicknesses during the second step of the heat treatment method. Such information as presented in FIG. 3 may be used to estimate the precise time interval during which the workpiece temperature is actually above the $\alpha$ transus. Graphs 31,33,35,37 correspond, respectively, to workpiece thicknesses of 1, 3, 5 and 10 mm. These graphs are based on one-dimensional radiation heat transfer in which the workpiece temperature is taken to be uniform through the thickness. Such an assumption is valid for workpieces whose thickness is of the order of 20 mm or less and for times of the order of 10s or longer for near-$\gamma$ titanium aluminides at the high heat treatment temperatures. The temperature transient may be expressed as:

$$\Delta T_w=(2e\sigma\Delta t/\rho ch)(T_F^4=TW^4),$$

where $T_w$ and $T_F$ are the workpiece and furnace temperatures (°K), e is the emissivity of the material, $\sigma$ is the Stefan-Boltzmann constant, t is the heating time, and $\rho$, c,h are the workpiece density, specific heat, and thickness, respectively. Furthermore, the time at temperatures above the $\alpha$ transus required for dissolution of the remnant $\gamma$ particles can be estimated from the analysis presented in Semiatin et al ("Homogenization of Near-Gamma Titanium Aluminides: Analysis of Kinetics and Process Scaleup Feasibility," Metall. Trans. 24A, 1295–1306 (1993)) the entire teachings of which are incorporated by reference herein. The analysis shows the importance of $\gamma$ particle diameter on required dissolution time, this time being directly proportional to the particle size.

The invention was demonstrated on samples of 3 mm thick rolled and recrystallized sheet of Ti-45.5A1-2Cr-2Nb (at%) ($\alpha$ transus =1290° C.) and 10 mm cubes of forged and recrystallized Ti-47A1-2Mn-2Nb (at%) $\alpha$ transus =1340° C.). The samples of Ti-45.5A1-2Cr-2Nb were first heated at 1240° C. for 600 sec and then heated at 1320° C. for 30, 60, 120 or 240 sec in separate samples, which resulted in final $\alpha$ grain sizes, respectively, of 110, 150, 180 and 220 μm. Samples of Ti-47A1-2Mn2Nb were first heated at 1300° C. for 600 sec and then heated at 1360° C. for 120 or 240 sec in separate samples, which resulted in final $\alpha$ grain sizes, respectively, of 125 and 250 μm. The invention was demonstrated using two separate indirect electric resistance furnaces, although other conventional heating means may be used, including, but not limited to, continuous gas-fired or indirect resistance heating furnaces, infrared heating element furnaces, and induction or direct resistance heating techniques.

It is also noted that, as would occur to the skilled artisan guided by these teachings, the invention may be applied to other binary and multicomponent near-y titanium aluminide alloys, including the alloys having compositions in the ranges Ti-(42–49)A1-(0–10)X, where X includes one or more alloying elements selected from the group including chromium, manganese, vanadium, niobium, tantalum, tungsten, molybdenum, silicon, boron, zirconium, taken singly or in combination. The method may be applied to similar titanium alloys such as conventional alpha-beta titanium alloys.

The invention therefore provides a heat treat method for making fully lamellar, moderate $\alpha$ grain size microstructures in near-$\gamma$ gamma titanium aluminide alloys having good room temperature strength, ductility and fracture toughness and high temperature creep resistance. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A method for heat treating titanium aluminide ahoy, comprising the steps of:

(a) providing titanium aluminide alloy material having a recrystallized microstructure of gamma phase grains in a matrix of alpha-2 phase or lamellar alpha-2 plus gamma phase;

(b) heating said material at a temperature 30 to 60 centigrade degrees below the alpha transus temperature of said alloy whereby a microstructure having equiaxed alpha phase grains surrounded by fine gamma phase grains is produced within said alloy;

(c) thereafter heating said alloy at a temperature 20 to 50 centigrade degrees above the alpha transus temperature of said alloy to dissolve said fine gamma phase grains to produce in said alloy substantially single phase equiaxed alpha grain structure of grain size in the range of 50 to 250 μm; and (d) thereafter cooling said alloy to transform the microstructure of said alloy to fully lamellar alpha-2 plus gamma phase.

2. The method of claim 1 wherein said alloy has a composition in the ranges Ti-(42–49)A1-(0–10)X, where X is one or more alloying elements selected from the group consisting of chromium, manganese, vanadium, niobium, tantalum, tungsten, molybdenum, silicon, boron, and zirconium.

3. The method of claim 1 wherein said alloy is an alpha-beta titanium alloy.

4. A method for heat treating titanium aluminide alloy, comprising the steps of:

(a) providing titanium aluminide alloy;

(b) hot working said material to produce therein a recrystallized microstructure of gamma phase grains in a matrix of alpha-2 phase or lamellar alpha 2 plus gamma phase;

(c) thereafter heating said alloy at a temperature 30 to 60 centigrade degrees below the alpha transus temperature of said alloy whereby a microstructure having equiaxed alpha phase grains surrounded by fine gamma phase grains is produced within said alloy;

(d) thereafter heating said alloy at a temperature 20 to 50 centigrade degrees above the alpha transus temperature of said alloy to dissolve said fine gamma phase grains to produce in said alloy a substantially single phase equiaxed alpha grain structure of grain size in the range of 50 to 250 μm; and (e) thereafter cooling said alloy to transform the microstructure of said alloy to fully lamellar alpha-2 plus gamma phase.

5. The method of claim 4 wherein said alloy has a composition in the ranges Ti-(42–49(A1-(0–10)X, where X is one or more alloying elements selected from the group consisting of chromium, manganese, vanadium, niobium, tantalum, tungsten, molybdenum, silicon, boron, and zirconium.

6. The method of claim 4 wherein said alloy is previously cast or previously cast and hot isostatically pressed.

7. The method of claim 4 wherein said alloy is an alpha-beta titanium alloy.

* * * * *